Patented July 7, 1942

2,288,589

UNITED STATES PATENT OFFICE 2,288,589

METHOD OF PLASTICIZING RESINS

Franklin A. Bent, Berkeley, and William L. Ponig, San Francisco, Calif., assignors to Shell Development Company, San Francisco, Calif., a corporation of Delaware No Drawing. Application December 4, 1939, Serial No. 307,482

6 Claims. (Cl. 260—26)

This invention relates to a method of plasticizing alcohol-soluble resins, both natural and synthetic, and to new plasticized resin compositions.

Many synthetic resins as well as a large number of natural resins have the property of being brittle with a tendency to crack unless measures are taken to increase their flexibility. For this purpose, substances known as plasticizers are incorporated with the resins and the resulting compositions have sufficient flexibility and extensibility so they may be used in numerous applications where the resins alone would be entirely unsatisfactory. To be suitable as a plasticizer for a resin, a substance must be compatible with the resin with which it is used, must be substantially non-volatile, and should be capable of being manufactured at low cost.

It is an object of the present invention to provide a method of plasticizing natural and synthetic alcohol-soluble resins. Another object of the invention resides in a method of plasticizing resins with substances which may be produced in an economical manner from readily available raw materials. A further object of the invention is to provide new compositions containing an alcohol-soluble resin and a plasticizer.

We have found that alcohol-soluble resins may be advantageously plasticized with completely hydrogenated products obtained by hydrogenating the condensation product of a lower ketone with a ketone or an aldehyde, said products containing at least 12 and preferably at least 18 carbon atoms per molecule. The plasticizer with which the resins are plasticized and rendered flexible is a mixture of one or more isomeric secondary alcohols.

The plasticizer may be prepared by first condensing a lower ketone with itself, a dissimilar ketone, or an aldehyde, under conditions which favor the formation of unsaturated ketones of high molecular weight. The unsaturated ketones resulting from the condensation reactions may then be completely hydrogenated to yield the substantially saturated alcohols which are employed to plasticize the resin.

The hydrogenation of the unsaturated ketones probably occurs in several steps. The hydrogen may add first to the double bonds to give a saturated ketone and the carbonyl group of the ketone may then be reduced to a carbinol group giving the desired higher alcohols. By the expression "completely hydrogenated" reference is therefore made to the reduction of the carbonyl group to a carbinol group as well as the substantially complete saturation of the ethylenic linkages with hydrogen in the unsaturated ketones.

Condensation of a lower ketone with a like ketone (itself), a dissimilar ketone or an aldehyde to form unsaturated condensation products of high molecular weight may be effected by conducting the reaction so as to favor crotonaldehyde type of condensation to the substantial exclusion of aldol type of condensation. To gain this end, strong catalysts may be employed and while the desired result may be achieved with strong mineral acids such as sulfuric acid, hydrochloric acid, and the like, it is preferred to employ strong mineral bases such as sodium hydroxide, potassium hydroxide and the like. By using strong mineral bases and removing the water formed by the reactions substantially as fast as formed, a number of molecules of reactants may be combined to yield the desired intermediate products, that is, unsaturated ketones containing at least 12 carbon atoms per molecule.

The ketones used as starting materials may be either saturated or unsaturated compounds. Suitable ketones include acetone, methyl ethyl ketone, methyl propyl ketone, diethyl ketone, methyl butyl ketone, diethyl ketone, methyl butyl ketone, methyl isobutyl ketone, methyl vinyl ketone, methyl isopropyl ketone, mesityl oxide, cyclopentanone, cyclohexanone, and the like and their homologues, analogues and suitable substitution products.

The ketones may be condensed with themselves by employing only a single reactant in the reaction mixture or they may be condensed with dissimilar ketones by using two or more ketones in the reaction mixture. In addition to the ketone or ketones, the reaction mixture may contain one or more aldehydes. These, like the ketones, may be either saturated or unsaturated compounds. Suitable aldehydes which may be employed include acetaldehyde, propionaldehyde, butyraldehyde, isobutyraldehyde, ethyl hexaldehyde, acrolein, methacrolein, crotonaldehyde, ethyl propyl acrolein, and the like and their homologues, analogues and suitable substitution products. Of the various ketones and aldehydes which may be utilized, mesityl oxide as a single reactant for the condensation reaction is a preferred substance. This material is readily available and gives good yields of the desired unsaturated ketones containing at least 12 carbon atoms per molecule.

Upon completion of the condensation reaction, the catalyst may be separated from the reaction products in any suitable manner. For example, the catalyst may be removed by washing the products with water and a neutralizing agent. The product may then be separated from the unreacted material and into fractions of suitable molecular weight by distillation or, if desired, the product may be hydrogenated without separation or the product after removal of the unreacted components may be hydrogenated. The condensation products are branched chain unsaturated ketones which may contain cyclic arrangements of part of the carbon atoms.

The unsaturated ketones resulting from the condensation reactions may be hydrogenated catalytically, preferably in the liquid phase, to yield the desired alcohols. The hydrogenation may be conducted at elevated temperatures and pressures in the presence of any suitable hydrogenation catalyst. Substances which may be employed as catalyst include nickel, cobalt, iron, copper, platinum and silver. The catalyst is preferably employed in a finely divided state and may, if desired, contain one or more promoters such as oxides of chromium, cerium or thorium. The catalyst may also be mounted upon a carrier such as active carbon, kieselguhr, activated alumina, silica gel or the like. One of the preferred catalysts for the hydrogenation is nickel prepared according to the method of Raney which is described in U. S. Patent No. 1,628,190.

The substantially complete hydrogenation of the unsaturated ketones may be accomplished at temperatures from about 50° C. to about 350° C., but preferably at 150 to 250° C. and at pressures from 100 to about 3000 pounds per square inch, preferably at 1000 to 3000 pounds per square inch. In order to avoid dehydrogenation of the alcohols which may occur upon release of pressure at high temperature in the presence of the catalyst, the temperature may be reduced while maintaining elevated pressures upon the alcohols. The hydrogenation catalyst may be removed from the products by filtration, distillation, centrifugation or in any other suitable manner.

In general, the hydrogenation catalysts are quite sensitive to poisons such as sulfur and halogens and the presence of these substances or compounds thereof may reduce or destroy the activity of the catalysts if present in appreciable amounts. It is therefore desirable to avoid contamination of the condensation products with impurities which act as catalyst poisons.

The substantially saturated alcohols employed in the invention are well suited for use as plasticizers. They are substantiallly non-volatile, especially those containing 18 or more carbon atoms per molecule, and they are therefore retained indefinitely in resin compositions in which they are incorporated. Furthermore, they are colorless substances which are light-stable. These properties coupled with their ready compatibility with alcohol-soluble resins make them excellent substances for plasticizing this type of resin. While alcohols containing at least 12 carbon atoms per molecule may be employed for this purpose, those containing from 18 to 24 carbon atoms are a preferred class. The alcohols containing more than 24 carbon atoms per molecule may be resinous solids and although these may also be employed, they are a less preferred group.

The higher alcohols are ideal substances for plasticizing polyvinyl acetal resins and the plasticized compositions obtained thereby are particularly well suited for use in laminated or shatter proof glass. Laminated glass requires the use of a resin composition which must meet quite rigid requirements. It is necessary that the compositions be clear and water-white which will not discolor in time and upon exposure to sunlight. The compositions must also be tough and have good adhesiveness for glass so that the glass will not part from the resin composition to an appreciable extent upon being shattered and broken. Furthermore, the compositions must not absorb or dissolve water to any noticeable extent and these various properties must be maintained over a wide range of temperature. For this purpose, polyvinyl acetal resins are well suited in that they are clear and water-white with good stability against discoloration. If used alone, however, they are brittle and have a tendency to crack. By plasticizing the polyvinyl acetal resins with the higher alcohols, compositions are obtained which possess toughness, flexibility, adhesiveness, excellent stability against discoloration, low susceptibility towards water, and retention of flexibility and adhesiveness at the low temperatures encountered during the winter months.

According to the invention, the polyvinyl acetal resins are plasticized by intimately mixing therewith the alcohols containing at least 12 carbon atoms per molecule. The method is applicable to the plasticizing of all types of polyvinyl acetal resins. These resins are prepared by a reacting polyvinyl alcohol or a hydrolyzed polyvinyl ester with an aldehyde. Applicable resins of this preferred type are those prepared from formaldehyde, acetaldehyde, butyraldehyde, isobutyraldehyde, acrolein, methacrolein, and the like.

Besides plasticizing polyvinyl acetal resins, the invention broadly contemplates plasticizing any alcohol-soluble resin. By an alcohol-soluble resin, reference is made to a resin which is soluble in a lower alcohol. Among the resins of this type which may be plasticized are the cellulose ethers such as ethyl cellulose, methyl cellulose, benzoyl cellulose, etc., the alcohol-soluble phenol-aldehyde resins such as modified phenol-formaldehyde resins, alcohol-soluble alkyd resins, phenol modified cumarone resins, polyvinyl acetate and the like. The above-mentioned resins are synthetic resins which may be plasticized by the method of the invention, but alcohol-soluble natural resins such as shellac, kauri gums, soft manila, manila lobar, mastic, pontianak, sandarac, Singapore dammar, boea, and the like, may also be plasticized.

The alcohol-soluble resins are plasticized by intimately mixing the alcohols containing at least 12 carbon atoms per molecule and preferably at least 18 carbon atoms with the resins. Any of the well known methods may be utilized to incorporate the plasticizer with the resin. The plasticizer may be worked into the resin on a heated roll-mill or the resin may be heated to render it fluid and the plasticizer incorporated in the resin by manual kneading or mechanical agitation. In some cases homogeneous mixtures may be obtained without heating, for example, by merely adding the resin to the plasticizer, with kneading or agitation, if desired. The mixing may also be done in the presence of a mutual solvent for the resin and the plasticizer. When the composition is to be used for surface coatings, the resin may be dissolved along with the plasticizer in the solvents; upon evaporation of the liquid vehicle, the plasticized resin will remain. It may be desirable to bake the film formed from the coating compositions.

The properties desired in the finished products largely determine the proportion of plasticizer incorporated with the resin. In general, the larger the proportion of plasticizer contained in a composition, the more flexible and plastic will be the finished product. In some cases, a few per cent of plasticizer will be ample to obtain the qualities desired while in others as much as equal parts or more of plasticizer to resin may be necessary.

The compositions of the invention have numerous uses. Besides being employed in laminated glass, as may the compositions containing polyvinyl acetal resins, the products may be used for moulding various valuable articles by methods well known to the art. The compositions may also be used to impregnate textiles, wood, paper, and the like and to insulate electrical devices, wire and cable. Some of the compositions are suitable for the preparation of filaments, threads, and fibers while others may be used to prepare films such as may be employed in photography, etc. An important application is in coating compositions for use as surface coverings such as lacquers, varnishes, and the like. The compositions containing natural resins are especially suited for the last-mentioned use.

For various special purposes to which the compositions may be put, it may be desirable to also incorporate other ingredients such as dyes, fillers, pigments, other plasticizers, other resins either synthetic or natural, and the like. For preparing coating compositions various solvents may be used such as alcohols, esters, ketones, and hydrocarbons.

For the purpose of illustrating the invention more fully, the following examples are given.

Example I

A quantity of 12 carbon atom alcohols was prepared by condensing mesityl oxide and completely hydrogenating the resulting product. This material was tested as a plasticizer for a polyvinyl acetal resin known to the trade as Vinylite X.

About two parts of resin and one part of plasticizer were dissolved in ethyl alcohol. The solution was used to coat a mercury amalgamated tin panel. The resulting film was dried at about 40° C. for 24 hours. The film was then stripped from the panel and the elongation of it was determined with a Scott tensile strength testing machine. The elongation is a measure of the flexibility of the film. It was found that the film had an elongation of 565%.

A similar film was prepared except that it was dried at ordinary temperature for one day. This film was found to have an elongation of 308%.

A film prepared without the use of the 12 carbon atom alcohol had an elongation of only 130%.

Example II

Another polyvinyl acetal resin known as Butvar was plasticized with the 12 carbon atom alcohols described in Example I. A mixture containing two parts of the resin and one part of the higher alcohols was dissolved in ethyl alcohol. A film was prepared by coating a mercury amalgamated tin panel and allowing the ethyl alcohol to evaporate. The film obtained by stripping the panel was found to have excellent flexibility.

Example III

Mesityl oxide was condensed in the presence of strong aqueous sodium hydroxide, and some 18 carbon atom alcohol was obtained by complete hydrogenation of the condensation product. The alcohol was a mixture of low boiling and high boiling isomers. A part of the mixture was distilled to obtain some of the low-boiling 18 carbon atom alcohol isomers.

Vinylite X was plasticized by making a solution in ethyl alcohol of two parts of resin and one part of the mixed low and high boiling isomers. A film was prepared from this solution by coating a panel and drying at 35 to 40° C. for one day. The resulting film was tested for flexibility and found to have an elongation of 307%.

The low-boiling 18 carbon atom alcohol was used to plasticize Vinylite X in a similar manner. The film prepared with it had an elongation of 328%.

A film prepared from Vinylite X which contained no plasticizer gave an elongation of only 130%.

Example IV

Some 24 carbon atom alcohols were prepared by condensing mesityl oxide and completely hydrogenating the product. This material was mixed with Vinylite X in the ratio of two parts of resin per part of plasticizer, and the resulting composition prepared into a film. The film was tested and found to have an elongation of 190%.

We claim as our invention:

1. A plasticized composition comprising an alcohol-soluble polyvinyl acetal resin and a plasticizer consisting of a substantially saturated normally liquid alcohol which contains from 12 to 24 carbon atoms and is obtained by effecting the self-condensation of mesityl oxide to an unsaturated ketone containing from 12 to 24 carbon atoms, and substantially completely hydrogenating the resulting condensation product.

2. A plasticized composition comprising an alcohol-soluble polyvinyl acetal resin and a plasticizer consisting of a substantially saturated normally liquid alcohol which contains from 12 to 24 carbon atoms and is obtained by condensing mesityl oxide with a compound of the group consisting of the aldehydes and ketones to form a higher molecular weight unsaturated ketone containing from 12 to 24 carbon atoms, and substantially completely hydrogenating the resulting condensation product.

3. A plasticized composition comprising an alcohol-soluble polyvinyl acetal resin and a plasticizer consisting of a substantially saturated normally liquid alcohol which contains from 12 to 24 carbon atoms and is obtained by condensing a lower ketone with a compound of the group consisting of the aldehydes and ketones to form a higher molecular weight unsaturated ketone containing from 12 to 24 carbon atoms, and substantially completely hydrogenating the resulting condensation product.

4. A plasticized composition comprising an alcohol-soluble resinous material and a plasticizer consisting of a substantially saturated normally liquid alcohol which contains from 12 to 24 carbon atoms and is obtained by effecting the self-condensation of mesityl oxide to an unsaturated ketone containing from 12 to 24 carbon atoms, and substantially completely hydrogenating the resulting condensation product.

5. A plasticized composition comprising an alcohol-soluble resinous material and a plasticizer consisting of a substantially saturated normally liquid alcohol which contains from 12 to 24 carbon atoms and is obtained by condensing mesityl oxide with a compound of the group consisting of the aldehydes and ketones to form a higher molecular weight unsaturated ketone containing from 12 to 24 carbon atoms, and substantially completely hydrogenating the resulting condensation product.

6. A plasticized composition comprising an alcohol-soluble resinous material and a plasticizer consisting of a substantially saturated normally liquid alcohol which contains from 12 to 24 carbon atoms and is obtained by condensing a lower ketone with a compound of the group consisting of the aldehydes and ketones to form a higher molecular weight unsaturated ketone containing from 12 to 24 carbon atoms, and substantially completely hydrogenating the resulting condensation product.

FRANKLIN A. BENT.
WILLIAM L. PONIG.